(12) United States Patent
Womack (10) Patent No.: US 10,352,685 B2
(45) Date of Patent: Jul. 16, 2019

(54) PRESSURE INSENSITIVE INTERFEROMETER

(71) Applicant: Geospace Technologies Corporation, Houston, TX (US)

(72) Inventor: Willard Womack, Austin, TX (US)

(73) Assignee: Geospace Technologies Corporation, Houston, TX (US)

( * ) Notice: Subject to any disclaimer, the term of this patent is extended or adjusted under 35 U.S.C. 154(b) by 0 days.

(21) Appl. No.: 15/529,444

(22) PCT Filed: Dec. 3, 2015

(86) PCT No.: PCT/US2015/063680
§ 371 (c)(1),
(2) Date: May 24, 2017

(87) PCT Pub. No.: WO2016/099925
PCT Pub. Date: Jun. 23, 2016

(65) Prior Publication Data
US 2017/0363412 A1 Dec. 21, 2017

Related U.S. Application Data (60) Provisional application No. 62/093,187, filed on Dec. 17, 2014.

(51) Int. Cl.
*G01B 9/02* (2006.01)
*G01V 1/38* (2006.01)
(Continued)

(52) U.S. Cl.
CPC ..... *G01B 9/02052* (2013.01); *G01B 9/02051* (2013.01); *G01V 1/38* (2013.01);
(Continued)

(58) Field of Classification Search
CPC ............ G01B 9/02052; G01B 9/02051; G01B 9/0207; G01B 9/02075; G02B 6/29349; G01H 9/004; G01V 1/38; G01M 11/331
(Continued)

(56) References Cited

U.S. PATENT DOCUMENTS 4,787,693 A  11/1988 Kogelnik et al.
4,887,883 A  12/1989 Darbut et al.
(Continued)

FOREIGN PATENT DOCUMENTS

JP     402293803 A     5/1990
JP     2002071970 A    12/2002
(Continued)

OTHER PUBLICATIONS

Search Report dated May 17, 2018 in corresponding European Patent Application No. 15870666.3; 7 pages.
(Continued)

*Primary Examiner* — Tarifur R Chowdhury
*Assistant Examiner* — Jonathon Cook
(74) *Attorney, Agent, or Firm* — Blank Rome LLP (57) ABSTRACT

A device. The device includes a substrate a substrate, a first optical waveguide disposed on the substrate and a second optical waveguide disposed on the substrate. The device further includes a coupling element disposed on the substrate, the coupling element configured to couple an optical signal in the first optical waveguide to the second optical waveguide, and couple an optical signal in the second optical waveguide to the first optical waveguide. A first reflective element is disposed at an end of the first optical waveguide configured to reflect optical signals in the first optical waveguide. A second reflective element disposed at an end of the second optical waveguide configured to reflect signals in the second optical waveguide.

20 Claims, 4 Drawing Sheets

(51) Int. Cl.
  *G02B 6/293* (2006.01)
  *G01V 8/02* (2006.01)
  *G01V 8/24* (2006.01)

(52) U.S. Cl.
  CPC ............... *G01V 8/02* (2013.01); *G01V 8/24* (2013.01); *G02B 6/29349* (2013.01)

(58) Field of Classification Search
  USPC ....................................................... 356/477
  See application file for complete search history.

(56) References Cited

U.S. PATENT DOCUMENTS

| | | | |
|---|---|---|---|
| 5,497,233 A | 3/1996 | Meyer | |
| 5,664,864 A | 9/1997 | Kuth | |
| 6,061,487 A | 5/2000 | Toyama et al. | |
| 6,366,390 B1 | 4/2002 | King et al. | |
| 6,408,119 B1 | 6/2002 | Meltz et al. | |
| 6,655,849 B1 | 12/2003 | Malavieille et al. | |
| 6,778,278 B2* | 8/2004 | Ahmadvand | G02B 6/29352 356/477 |
| 7,231,116 B2 | 6/2007 | Tanaka et al. | |
| 7,688,673 B2 | 3/2010 | Ronnekleiv et al. | |
| 2002/0044713 A1* | 4/2002 | Hung | G02B 6/266 385/15 |
| 2002/0106149 A1 | 8/2002 | Tehrani | |
| 2003/0123781 A1 | 7/2003 | Rockwell et al. | |
| 2004/0156580 A1* | 8/2004 | Baumann | G02B 6/12007 385/16 |
| 2004/0239940 A1 | 12/2004 | Gurunathan et al. | |
| 2006/0119857 A1* | 6/2006 | Steffens | G01J 9/0246 356/477 |
| 2007/0146721 A1* | 6/2007 | Barcelos | G01M 11/3136 356/477 |
| 2008/0112261 A1 | 5/2008 | Ronnekleiv et al. | |
| 2008/0112264 A1 | 5/2008 | Ronnekleiv et al. | |
| 2009/0263040 A1* | 10/2009 | Rolland | A61B 5/0059 382/255 |
| 2011/0149294 A1* | 6/2011 | Song | G01N 21/45 356/477 |
| 2012/0067118 A1 | 3/2012 | Hartog et al. | |
| 2012/0194823 A1* | 8/2012 | Moore | G01B 9/02004 356/479 |
| 2013/0183003 A1 | 7/2013 | Cairns | |
| 2014/0046599 A1 | 2/2014 | Smith et al. | |
| 2014/0078508 A1* | 3/2014 | Aota | H04B 10/677 356/450 |
| 2014/0112094 A1 | 4/2014 | Fernihough | |
| 2014/0140655 A1 | 5/2014 | Chakravarty et al. | |
| 2014/0160487 A1* | 6/2014 | Huang | A61B 5/0066 356/479 |
| 2014/0312903 A1 | 10/2014 | Olsson et al. | |
| 2014/0339411 A1 | 11/2014 | Lagace et al. | |
| 2015/0009507 A1* | 1/2015 | Yasuno | G01N 21/4795 356/479 |

FOREIGN PATENT DOCUMENTS

| | | |
|---|---|---|
| WO | 03/098156 A1 | 11/2003 |
| WO | 2012/082796 A1 | 6/2012 |
| WO | WO2012/082796 A1 | 6/2012 |

OTHER PUBLICATIONS

EP Search Report dated Jun. 6, 2018 for European Patent Application No. 15870668.9 filed Mar. 12, 2015; 9 pages.
Search Report dated Jul. 17, 2018 for European Patent Application No. 15870664.8, 6 pages.
Fu, Yunfei et al., "Efficient adiabatic silicon-on-insulator waveguide taper," Photon. Res., Jun. 2014, vol. 2, No. 3, 4 pages.
Karppinen, Mikko et al., "Multilayer Single-mode Polymeric Waveguides by imprint patterning for optical interconnects," VTT Technical Research Centre of Finland, Feb. 3, 2014, 25 pages.
PCT Search Report and Written Opinion, Application No. PCT/US2015/063699, dated Mar. 23, 2016.
International Search Report for PCT Application No. PCT/US2015/063680, dated Feb. 19, 2016.
"Dupont Hytrel Thermoplastic Polyester Elastomers Design Guide".
"3M Fluorinert Electronic Liquid FC-72 Product Information" May 2000, 3M IPC.

* cited by examiner

PRESSURE INSENSITIVE INTERFEROMETER

CROSS-REFERENCE TO RELATED APPLICATIONS

This application claims the benefit of U.S. Provisional Application Ser. No. 62/093,187 filed Dec. 17, 2014 and titled "Pressure Insensitive Interferometer". The provisional application is incorporated by reference herein as if reproduced in full below.

BACKGROUND

Permanent hydrocarbon reservoir monitoring is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional (4D) seismic.

Marine-based permanent reservoir monitoring faces significant challenges that are not faced by land-based permanent monitoring systems. This is particularly true of ocean bottom installations as water depths extend into the 1000 meter range and beyond. In particular, components comprising the sensors and associated data communication systems disposed on the sea floor may be exposed to sea water, high humidity and condensation, and subject to hydrostatic stresses arising in the submarine environment.

BRIEF DESCRIPTION OF THE DRAWINGS

For a detailed description of exemplary embodiments, reference will now be made to the accompanying drawings in which.

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Marine environment" shall mean an underwater location regardless of the salinity of the water. Thus, even an underwater location in a body of fresh water shall be considered a marine environment.

"Sea floor" shall mean the boundary of a body of water and the underlying sediment or rock. The term sea floor shall not imply anything regarding the salinity of the water, and thus even the boundary of a body of fresh water and the underlying sediment or rock shall be considered a sea floor.

"Surface" in relation to the location of a physical object in the context of a water body shall mean any location 100 feet below mean sea level and above.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various example devices and methods are directed to components of permanent hydrocarbon reservoir monitoring systems used in marine environments (e.g., in the range of 1000 meters of water depth). Permanent in this context indicating that the example systems can be used in reservoir monitoring where the various devices for monitoring are left on the sea floor indefinitely; however, the example systems can be used in any reservoir monitoring context. More particularly still, at least some of the various embodiments are directed to optical-based permanent reservoir monitoring in marine environments. The specification first turns to an illustrative system to orient the reader, and then to specifics regarding devices employed in conjunction with such a system.

Figure 1:
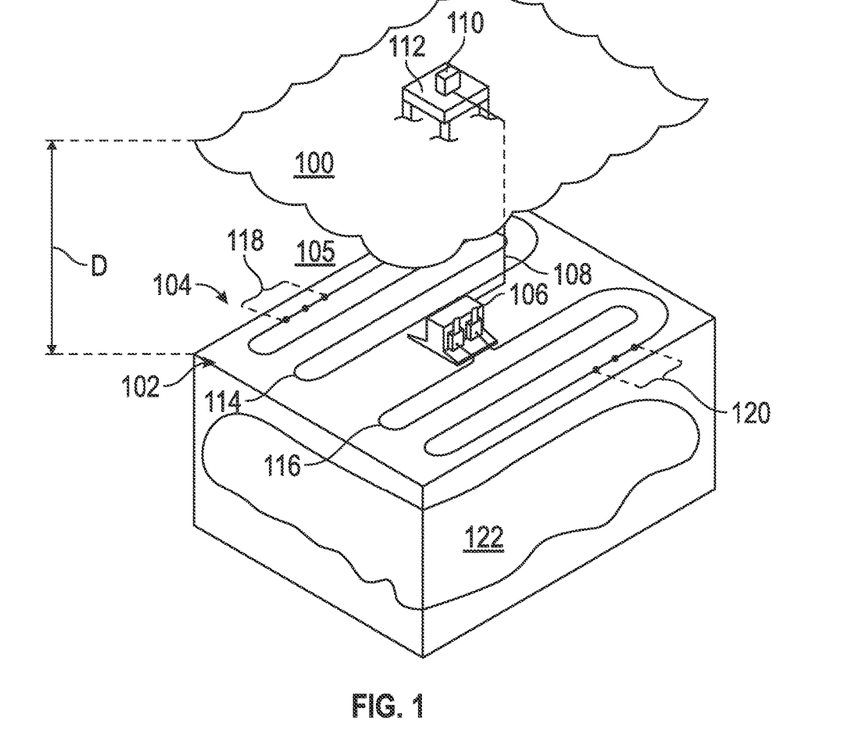
FIG. 1 shows a perspective cut-away view of a hydrocarbon reservoir monitoring system in accordance with at least some embodiments.

FIG. 1 shows a perspective cut-away view of a portion of a marine environment comprising a permanent reservoir monitoring system in accordance with at least some embodiments. In particular, FIG. 1 shows the surface 100 of the water. At a distance D below the surface 100 resides the sea floor 102, and below the sea floor 102 resides a hydrocarbon reservoir 122.

Within the environment of FIG. 1 resides an example reservoir monitoring system 104. In some cases, reservoir monitoring system 104 is installed and remains in place for an extended period of time, and thus may be considered a "permanent" reservoir monitoring system. The example reservoir monitoring system 104 comprises a base unit 106 installed on the sea floor 102. The base unit mechanically and communicatively couples to an umbilical cable 108 that extends from the base unit 106, through water body 105, to a computer system at the surface. In the example system of FIG. 1, the computer system 110 may reside on a vessel 112 floating on the surface 100. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables discussed more below, are communicatively coupled to the computer system 110.

A reservoir monitoring system may comprise at least one sensor cable, and in the example system of FIG. 1 the reservoir monitoring system 104 comprises two sensor cables 114 and 116. In the system of FIG. 1, each sensor cable 114, 116 mechanically and communicatively couples to the base unit 106 on each end for redundancy of communication, in case of a communicative break along the sensor cable. The length of the sensor cables 114, 116 may vary depending upon the particular situation, and the length of sensor cables coupled to a base unit need not be the same. For example, in one situation a loop of sensor cable (e.g., sensor cable 114) may be on the order of 19 kilometers (km) in length, while another loop of sensor cable (e.g., sensor cable 116) may be on the order of 50 km.

Each sensor cable 114, 116 may comprise a plurality of seismic measurement devices, such as sensor devices 118 associated with sensor cable 114, and sensor devices 120 associated with sensor cable 116. While only three devices 118 are shown associated with sensor cable 114, in practice many hundreds or thousands of such sensor devices may be spaced along the sensor cable 114. Likewise, while only three sensor devices 120 are shown associated with sensor cable 114, in practice many hundreds or thousands of such sensor devices may be placed along the sensor cable 116. The sensor devices 118 and 120 need not, however, be evenly spaced along the sensor cables 114 or 116, and extended portions of the sensor cables may be without sensor devices. For example, lead-in portions of the sensor cable may have long expanses (e.g., multiple kilometers) within which no sensor devices are located.

The embodiments illustrated and discussed in the current specification herein developed in the context of an optical system—with no electrical current flowing along the umbilical cable 108 and/or the sensor cables 114, 116. Persons having ordinary skill will understand that the system described and claimed is not limited to optical-only systems, and mixed optical and electrical systems may be implemented in conformance with aspects of this disclosure.

The sensor devices may take any suitable form. For example, the sensor devices may be single-axis geophones, which measure minute changes in velocity. In some cases, the single-axis geophones may be gimbaled such that the geophones measure only vertical (i.e., aligned with the force of gravity) changes in velocity. In yet other cases, the geophones may be three-axis geophones, which measure changes in velocity in all three spatial dimensions. In other cases, the sensor devices may be hydrophones which measure pressure or sound. In still other cases, multiple different kinds of sensor devices may be used in the same cable, including hydrophones and geophones. In some cases, the geophones and/or hydrophones may be passive optical devices, meaning the geophones and/or hydrophones are powered by optical energy conveyed along one or more optical fibers, and likewise modulate recorded data in the form of optical signals along the same or different optical fibers in response to seismic, acoustic or other signals impinging on the sensor devices. As described above, the data may be communicated to computer system 110. In at least some embodiments, modulation may be in the form of angle modulation, e.g. phase or frequency modulation, of the optical energy. Optical signals comprising the modulated optical energy may be demodulated to retrieve the recorded data for further processing by computer system 110, or, alternatively, by a data processing system onshore. However, as described further below, acoustic and/or seismic noise in the marine environment, acting on the sensor devices or optical components, such as optical fibers in cables 114 and 116, can modulate the optical properties of the components, which, in turn, can introduce noise and other distortion into the optical signals. Sensor devices themselves, or the cables, may incorporate devices to measure the phase noise, and in a marine environment, such devices can be subject to hydrostatic stress, among other things. Thus, these devices may require an atmospheric housing to isolate them from the hydrostatic stress. Further, such devices may also require isolation from external disturbances which would otherwise appear as noise within the device itself and thereby mask the desired measurements. Thus, the design of devices for measuring optical signals within a reservoir monitoring system which accommodates the constraints imposed by the marine environment can be complex, costly and complicated to integrate into the system.

Figure 2:
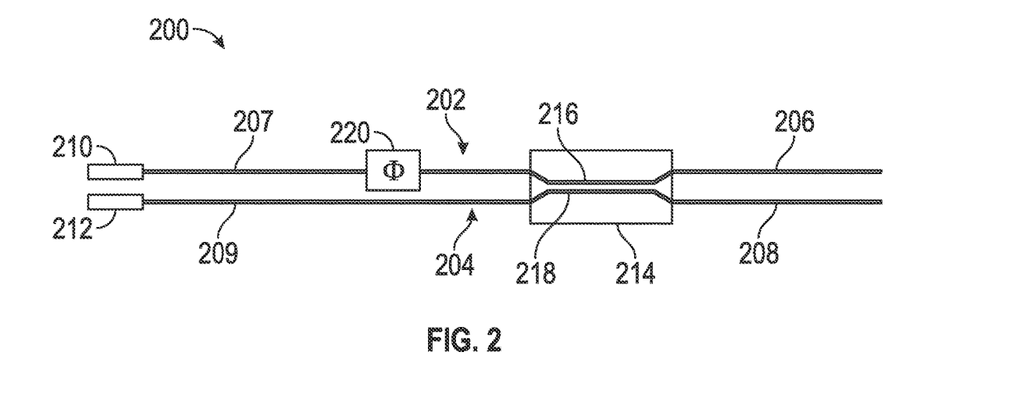
FIG. 2 shows a block diagram of a device in accordance with at least some embodiments.
Figure 2A:
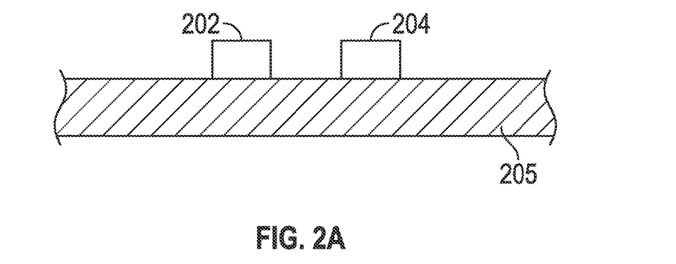
FIG. 2A shows an elevation view of a portion of the device of FIG. 2 in accordance with some embodiments.

FIG. 2 shows a functional block diagram of an interferometric device 200 in accordance with at least some embodiments which may address the aforesaid marine environmental factors associated with measuring optical signals in an underwater reservoir monitoring system. Interferometric device 200 may include two optical waveguides 202 and 204. In at least some embodiments, optical waveguides 202 and 204 may comprise an optically transmissive dielectric material disposed on a substrate material such as silicon, ceramics, glass, plastic, e.g. polymethylmethacrylate (PMMA) or printed circuit board (PCB) material. FIG. 2A illustrates an exemplary pair of optical waveguides 202, 204 disposed on a substrate material 205. Polymer optical waveguides may be fabricated using, for example, three-dimensional (3-D) printing techniques, or alternatively die stamping techniques. In other embodiments the optical waveguides may comprise silicon/silicon dioxide ($Si/SiO_2$) (core/cladding) disposed on a silicon substrate. Such optical waveguides may be fabricated using techniques analogous to those used in the fabrication of semiconductor integrated circuits. An integrated interferometric device 200 may be encapsulated in any suitable material and disposed within any suitable enclosure (not shown in FIG. 2). For example, interferometric device 200 may be enclosed in a thin metallic shell of stainless steel, or a non-ferrous metal such as aluminum or brass. A non-metallic shell may also be used. The enclosure may be filled with a pressure-balancing fluid, which may serve to resist the hydrostatic stress associated with a deployment in a marine environment, and, in particular, a deployment without an atmospheric housing.

Optical waveguide 202 may include a segment 206 which may be configured to receive an optical signal from a reservoir monitoring system, as described further below. In at least some embodiments, segment 206 may be coupled to an optical fiber in a sensor cable in a reservoir monitoring system, also further described below. Similarly, optical waveguide 204 may include a segment 208 which may be configured to output an optical interferometric signal, comprising a coherent superposition of the optical signals in optical waveguides 202, 204, to the reservoir monitoring system. It would be appreciated by those skilled in the art, that either segment 206 or segment 208 may serve as an input port or, conversely, an output port.

Reflective elements 210 and 212 may be disposed at an end of optical waveguide 202 and optical waveguide 204, respectively, and configured to reflect optical signals in the respective optical waveguide 202, 204. One or both of reflective elements 210 and 212 may comprise, in some embodiments, a Faraday rotating mirror (FRM). An FRM rotates the polarization of an optical signal impinging on it by ninety degrees and specularly reflects the optical signal. An FRM may be used, for example, to correct for polarization distortion that might be introduced by the optical waveguides. However, in other embodiments, a mirror, a phase conjugator, a reflective grating, or a reflective material, (e.g., aluminum, gold or silver deposited on the end of the optical waveguide) may be used in either or both of reflective elements 210, 212.

Interferometric device 200 also includes coupling element 214. Coupling element 214 may be configured to couple an optical signal in a first optical waveguide to a second optical waveguide, and, conversely, couple a signal in the second optical waveguide to the first optical waveguide. Optical waveguides 202, 204 may be integrated in coupling element 214. Thus, coupling element 214 may comprise segment 216 of optical waveguide 202 and segment 218 of optical waveguide 204 disposed substantially parallel and adjacent to each other in spaced-apart fashion. For example, coupling element 214 may also be disposed on the substrate. In coupling element 214, a fraction of the optical signal within each of optical waveguides 202, 204 may be coupled to the other. For example, an optical field associated with an optical signal within segment 216 of optical waveguide 202 may extend outside of an outer surface of optical waveguide 202. An optical field outside of an optical waveguide may exponentially decay in amplitude with increasing distance from the outer surface of the optical waveguide. Thus, by choice of a distance between the segments 216, 218 of optical waveguides 202 and 204, a desired fraction of optical energy may be may be coupled from optical waveguide 202 to optical waveguide 204. Likewise, an optical signal in optical waveguide 204 may be coupled to optical waveguide 202 in similar fashion. As described further below, coupling element 214, via the coupling of optical signals between optical waveguides 202, 204, may serve in a role analogous to a beamsplitter in a free-space optical interferometer such as a Michelson interferometer. In embodiments in which optical waveguides 202 and 204 are fabricated on a substrate as described above, coupling element 214 may be similarly fabricated.

Interferometric device 200 may also include a delay element 220 coupled to optical waveguide 202. Delay element 220 is, in the example embodiment in FIG. 2, disposed within arm 207 of interferometric device 220. However, in alternative embodiments, delay element 220 may be included in arm 209. Arms 207 and 209 comprise segments of optical waveguides 202 and 204, respectively disposed between coupling element 214 and respective reflective elements 210 and 212. Delay element 220 may be disposed on a substrate similar to and along with optical waveguides 202, 204. In some embodiments, delay element 220 may provide a delay (as measured in phase units), $\phi$, of ninety degrees ($\pi/2$ radians), and, in other embodiments, a delay, $\phi$, of forty-five degrees ($\pi/4$ radians) may be provided. In still other embodiments, delay element 220 may provide a preselected delay in the range of 0 to $2\pi$. Delay element 220 may be integrated in interferometric device 200 to provide dispersion compensation, for example. Further, in at least some embodiments in which data is angle modulated on the optical signals, a delay may be provided by delay element 220 based on a modulation depth of the angle modulation. Stated otherwise, in such embodiments, if the angle modulation depth is measured by the phase angle $\theta_p$, the delay element 220 may have $\phi=\theta_p$. In at least some embodiments, delay element 220 may comprise a segment of an optical waveguide 202, 204 having a difference in refractive index with respect to the refractive index of optical waveguides 202, 204 outside of delay element 220. Further, in at least some other embodiments of interferometric device 200, delay element 220 may be omitted.

Figure 3:
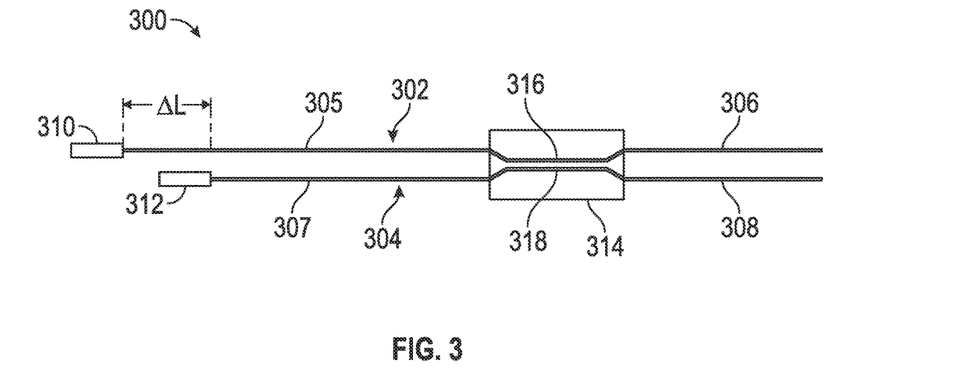
FIG. 3 shows a block diagram of a device in accordance with at least some embodiments.

Turning now to FIG. 3, shown therein is a functional block diagram of an interferometric device 300 in accordance with another embodiment of the disclosure. Interferometric device 300 may also address the environmental effects encountered in conjunction with measuring optical signals in a reservoir monitoring system. Interferometric device 300 may include two optical waveguides 302 and 304. Similar to optical waveguides 202 and 204, in at least some embodiments, optical waveguides 302 and 304 may comprise an optical polymer disposed on a substrate, such as silicon, glass, plastic, ceramic or printed circuit board material (not shown in FIG. 3). In other embodiments the optical waveguides may comprise silicon/silicon dioxide ($Si/SiO_2$) (core/cladding) disposed on a silicon substrate. Such optical waveguides may be fabricated using techniques analogous to those used in the fabrication of semiconductor integrated circuits. An interferometric device 300 may be encapsulated in any suitable material and disposed within any suitable enclosure, which may be filled with a pressure-balancing fluid, which pressure-balancing fluid may serve to resist the hydrostatic stress associated with a deployment in a marine environment without an atmospheric housing, as described above.

Optical waveguide 302 may include a segment 306 which may be configured to receive an optical signal from a reservoir monitoring system as described above in conjunction with interferometric device 200. Segment 306 may be configured to couple to an optical fiber coupled to the reservoir monitoring system, for example, segment 306 comprising an input port of interferometric device 200. Optical waveguide 304 may include a segment 308 which may be configured to output an optical signal to a reservoir monitoring system. Segment 308 may be also be configured to couple to an optical fiber coupled to the reservoir monitoring system, for example, segment 308 comprising an output port of interferometric device 200. It would be appreciated by those skilled in the art, and as described further below, that either segment 306 or segment 308 may serve as an input port and vice versa.

Reflective elements 310 and 312 may be disposed at an end of optical waveguide 302 and optical waveguide 304, respectively. One or both of reflective elements 310 and 312 may comprise, in some embodiments, a Faraday rotating mirror. An FRM rotates the polarization of an optical signal impinging on it by ninety degrees and then specularly reflects the optical signal. Such an embodiment may be used, for example, to correct for polarization distortion that might be introduced by the optical waveguides. However, in other embodiments, a mirror, a phase conjugator, a reflective grating, or a reflective material deposited on the end of the optical waveguide may be used in one or both of reflective elements 310, 312.

Interferometric device 300 may further include coupling element 314. Coupling element 314 may comprise segment 316 of optical waveguide 302 and segment 318 of optical waveguide 304 disposed substantially parallel and adjacent to each other in spaced-apart fashion. In coupling element 314 a fraction of the optical signal within each of optical waveguides 302, 304 may be coupled to the other. For example, an optical field associated with an optical signal within segment 316 of optical waveguide 302 may extend outside of an outer surface of optical waveguide 302. An optical field outside of an optical waveguide may exponentially decay in amplitude with increasing distance from the outer surface of the optical waveguide. Thus, by choice of a distance between the segments 316, 318 of optical waveguides 302, 304 a desired fraction of optical energy may be may be coupled from optical waveguide 302 to optical waveguide 304. Likewise, an optical signal in optical waveguide 304 may couple to optical waveguide 302.

Similar to coupling element 214, coupling element 314 may serve in a role analogous to a beamsplitter in a free-space optical interferometer. In embodiments in which optical waveguides 302 and 304 are fabricated on a substrate as described above, coupling element 314 may be similarly fabricated, and interferometric device 300 may comprise a monolithic device.

In interferometric device 300, arms 305 and 307, comprising segments of optical waveguides 302 and 304 disposed between coupling element 314 and respective reflective elements 310 and 312 may have different lengths, as illustrated. Stated otherwise, the length of arms 305 and 307 may, in at least some embodiments, be unequal. Thus, in operation, interferometric device 300 may be an unbalanced device having a delay based on the unbalance of arms 305 and 307. Thus, a delay may be incorporated in interferometric device 300 based on the unbalance, or length difference, between arms 305 and 307. For example, if the unbalance is denoted $\Delta L$ and the wavenumber of an optical signal along optical waveguides 302, 304 denoted by $k_g$, then the delay (in units of phase), $\phi$, may be given by:

$$\phi = k_g \cdot \Delta L. \quad (1)$$

As shown, device interferometric 300 does not include a delay element. However, a delay element may be incorporated in at least some embodiments of interferometric device 300 in the same way as delay element 220 is included in interferometric device 200.

Figure 4:
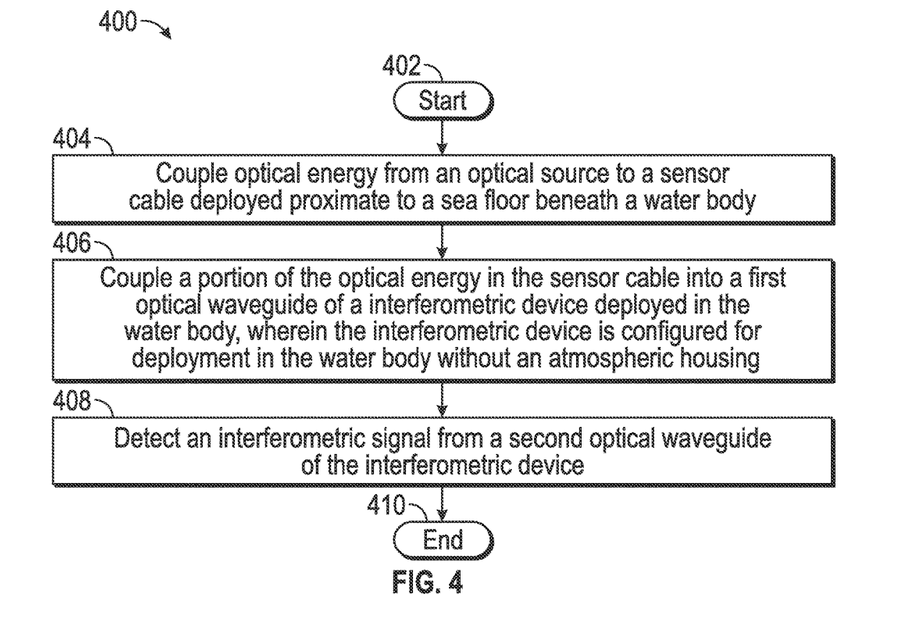
FIG. 4 shows a flow diagram of a method in accordance with at least some embodiments.

Turn now to FIG. 4 showing a flow chart of a method 400 in accordance with at least some embodiments employing an interferometric device 200 as in FIG. 2 or an interferometric device 300 as in FIG. 3. Method 400 starts at block 402. Optical energy from an optical source is coupled to a sensor cable deployed proximate to a sea floor beneath a water body, block 404. In block 406, a portion of the optical energy in the sensor cable is coupled to a first optical waveguide of an interferometric device deployed beneath the water body. The interferometric device may be deployed in an absence of an atmospheric housing. An optical interferometric signal from a second segment of the interferometric device is detected in block 408. Method 400 ends at block 410.

Figure 5:
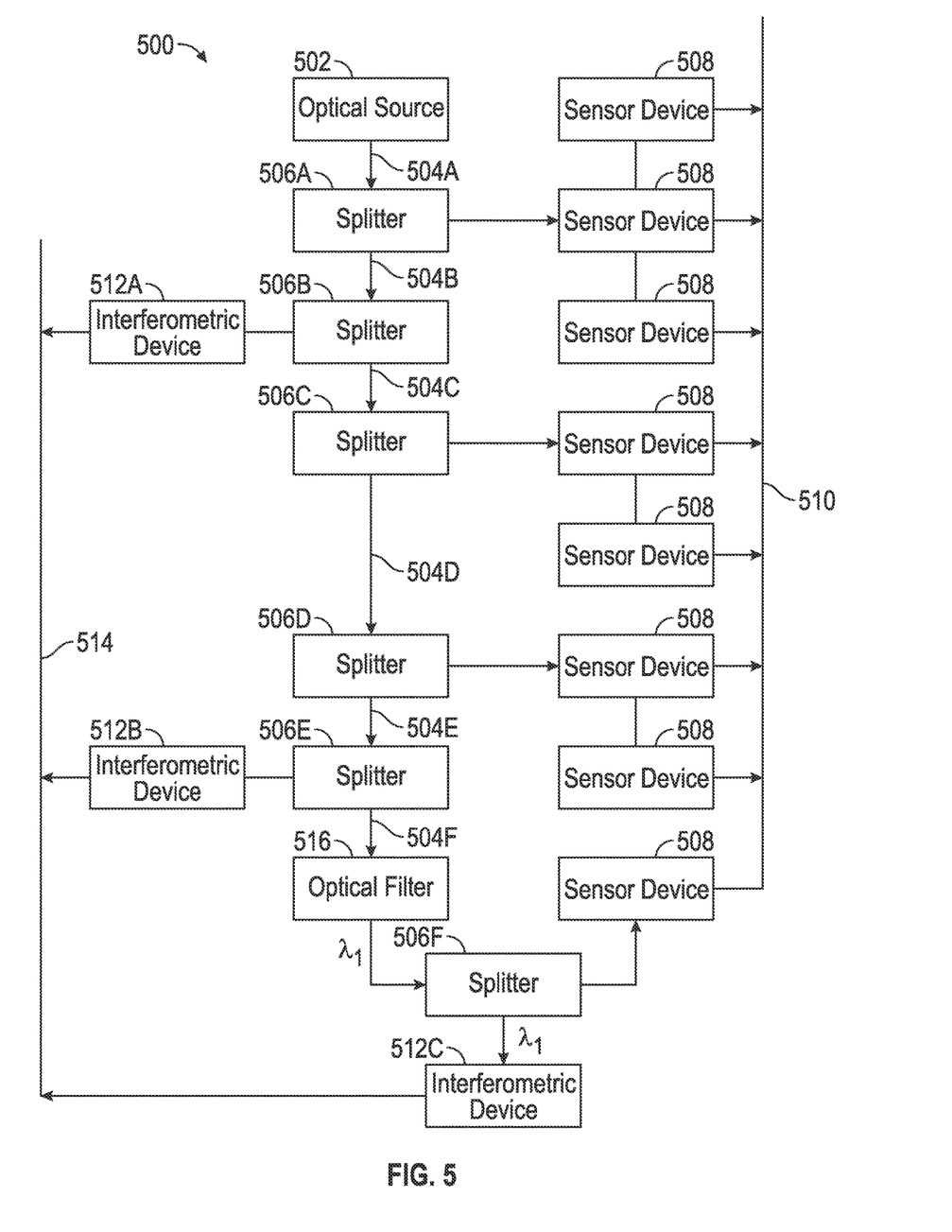
FIG. 5 shows a block diagram of a portion of a hydrocarbon reservoir monitoring system in accordance with at least some embodiments.

To further appreciate the coupling of an interferometric device to a sensor cable as deployed in a reservoir monitoring system in a marine environment refer now to FIG. 5. FIG. 5 shows a block diagram of a portion 500 of a reservoir monitoring system. An optical source 502 generates optical energy at one or more optical wavelengths. Optical source 502 may include, for example, solid-state lasers, semiconductor lasers or gaseous lasers. The optical energy generated by optical source 502 may be coupled into an optical fiber 504A portions of which may be disposed, for example, within umbilical cable 118 and other portions within one of sensor cables 114 or 116 in example reservoir monitoring system 104 (FIG. 1). The optical energy transported within optical fiber 504 is split or divided at a splitter 506A. Splitter 506A may be any suitable device for dividing the optical energy in optical fiber 504. For example, splitter 506A may be a partially-reflecting, partially-transmitting reflective device, or a prismatic beamsplitter. A portion of the optical energy is coupled to sensor devices 508, which may correspond to sensor devices 118 or 120 in exemplary reservoir monitoring system 104, wherein the sensor devices 508 modulates data onto the optical energy as previously described. Eight sensor devices 508 are shown in portion 500 for simplicity. In practice, hundreds, or thousands of sensor devices 508 may be used. The modulated optical energy may then be multiplexed onto optical fiber 510 and communicated to a detector (not shown in FIG. 5) which may be deployed on board vessel 112 and the data demodulated for analysis by computer system 110, for example. The remaining portion of the optical energy in optical fiber 504A is coupled to optical fiber 504B.

At splitter 506B, the optical energy is divided again, and a portion coupled to interferometric device 512A. Interferometric device 512A may be, an interferometric device 200, an interferometric device 300, or an interferometric device 600 described below in conjunction with FIG. 6. For example, the portion of optical energy coupled to interferometric device 512A may be coupled to segment 206 of interferometric device 200, or segment 306 of interferometric device 300. An optical interferometric signal output by interferometric device 512A may be multiplexed onto optical fiber 514 and communicated to a detector (not shown in FIG. 5) which may be deployed, for example, on board vessel 112 and the data demodulated for analysis by computer system 110. Exemplary analysis of the optical interferometric signal may include analysis of optical noise which may be superimposed on optical carrier signals comprising the optical energy. A portion of the optical noise may arise in the optical source itself and additional noise may be generated during the transmission of the optical energy from the optical source to the sensor devices. Further, the optical carrier signals may comprise a plurality of optical carrier wavelengths, as, for example, in a wavelength division multiplex (WDM) embodiment. Nonlinear effects, for example within the optical fibers, may introduce cross-talk between the optical carrier wavelengths, or channels. Analysis of the optical interferometric signals may be used to measure such interactions between channels.

The remaining portion of the optical energy that is transmitted through optical splitter 506B may be further coupled via optical fiber 504C to other sensor devices 508 via further splitters 506C, 506D, 506E, 506F and optical fibers 504D, 504E, 504F. Portions of the optical energy may be sampled by interferometric devices 512B, via splitter 506E and interferometric device 512C via splitter 506F. Optical interferometric signals output by interferometric device 512B may be multiplexed onto optical fiber 514 and communicated to a data processing system for analysis as previously described. Thus, for example, the optical noise introduced by components of portion 500 between interferometric device 512A and interferometric device 512B may be measured. In at least some embodiments, optical energy may be filtered such that a single optical carrier wavelength is coupled into an interferometric device. For example, optical energy coupled out of splitter 506E via optical fiber 504F may be filtered at optical filter 516 such that a portion of the optical energy in a single channel, $\lambda_1$, is coupled to interferometric device 512C. An optical interferometric signal output by interferometric device 512C may also be multiplexed onto optical fiber 514. Analysis of the optical interferometric signal output from interferometric device 512C may be used, for example, to measure the noise component of the optical energy within a bandpass of optical filter 516 about the wavelength $\lambda_1$. For example, a thin-film optical filter may be used in at least some embodiments of an optical filter 516, however any suitable optical filter may be used. Although three interferometric devices 512A-512C are shown in portion 500, in practice tens or hundreds of interferometric devices may be used.

Figure 6:
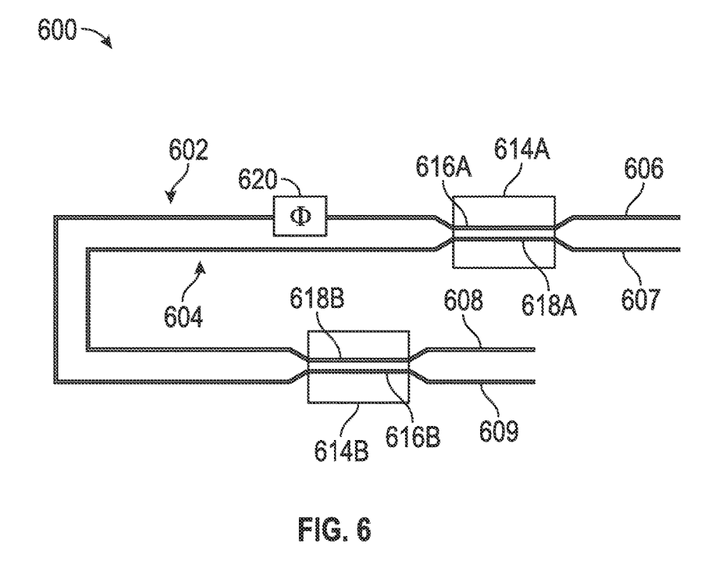
FIG. 6 shows a block diagram of a device in accordance with at least some embodiments.

Refer now to FIG. 6 showing an interferometric device 600 in accordance with at least some embodiments. Interferometric device 600 may include two optical waveguides 602 and 604. Similar to optical waveguides 202, 204, in at least some embodiments, optical waveguides 602 and 604 may comprise an optical polymer disposed on a substrate such as silicon, glass, plastic, ceramic or printed circuit board material. In other embodiments the optical waveguides may comprise silicon/silicon dioxide (Si/SiO$_2$) (core/cladding) disposed on a silicon substrate. Such optical waveguides may be fabricated using techniques analogous to those used in the fabrication of semiconductor integrated circuits. An interferometric device 600 may be encapsulated in any suitable material and disposed within any suitable enclosure, which may be filled with a pressure-balancing fluid, which may serve to resist the hydrostatic stress associated with a deployment in a marine environment without an atmospheric housing.

Optical waveguide 602 may include a segment 606 which may be configured to receive an optical signal from a reservoir monitoring system, as described above in conjunction with the exemplary portion 500. Alternatively, segment 607 may be configured to receive an optical signal from a reservoir monitoring system. Optical waveguide 604 may include a segment 608 which may be configured to output an interferometric optical signal to a reservoir monitoring system, also described above in the example portion 500. Alternatively, the interferometric signal may be output at segment 609. It would be appreciated by those skilled in the art, that either segment 606 or segment 607 may serve as an input port with either segment 608 or 609 as an output port. Conversely, either segment 608 or 609 may serve as an input port with either segment 606 or segment 607 as the output port.

Interferometric device 600 may further include coupling elements 614A and 614B. Coupling element 614B may be disposed at a distance along a direction of propagation of optical signals in optical waveguides 602, 604 from coupling element 614A. Optical waveguides 602, 604 may be integrated in coupling elements 614A, 614B. Thus, coupling element 614A may comprise segment 616A of optical waveguide 602 and segment 618A of optical waveguide 604 disposed substantially parallel and adjacent to each other in spaced-apart fashion. At coupling element 614A, a fraction of the optical signal within segment 606 may be coupled to optical waveguide 604 as described above. Likewise, coupling element 614B may comprise segments 616B and 618B of optical waveguides 602 and 604, respectively. The optical signal in optical waveguide 604, which may comprise the fraction of optical energy coupled from segment 606, and the remaining optical energy which propagates in optical waveguide 602, may be coupled at coupling element 614B. An optical interferometric signal generated thereby and comprising a coherent superposition of the optical signals in optical waveguides 604, 604 may be output at segment 608. By way of example, the optical interferometric signal may be output to a reservoir monitoring system as described above in conjunction with FIG. 5. Thus, coupling element 614A and 614B may serve in a role analogous to the two beamsplitters in a free-space optical interferometer such as a Mach-Zehnder interferometer. In embodiments in which optical waveguides 602 and 604 are disposed on a substrate as described above, coupling elements 614A, 614B may be similarly fabricated. As previously described, an end of a first optical waveguide, e.g. an end of segment 606, at a first coupling element may comprise an input port of interferometric device 600 and an end of either of the first optical waveguide and a second optical waveguide at a second coupling element, e.g. ends of segments 608, 609, may comprise an output port of the device. Further, as previously described the converse configuration may be employed.

Interferometric device 600 may also include a delay element 620 coupled to, or, alternatively, disposed within optical waveguide 602. Delay element 620 may be disposed on a substrate similar to and along with optical waveguides 602, 604. In some embodiments, delay element 620 may provide a delay (as measured in phase units), $\phi$, of ninety degrees ($\pi/2$ radians), and, in other embodiments, a delay, $\phi$, of forty-five degrees ($\pi/4$ radians) may be provided by delay element 620. Delay element 620 may be included in interferometric device 600 to provide dispersion compensation, for example. In at least some embodiments in which data is phase modulated on the optical signals, a delay may be provided by delay element 620 based on a modulation depth of the angle modulation. Stated otherwise, in such embodiments, if the angle modulation depth is measured by the phase angle $\theta_p$, then the delay element 600 may be have $\phi=\theta_p$. Although delay element 620 is, by way of example, coupled to, or disposed within optical waveguide 602, delay element 620 could, in other embodiments, be coupled to or disposed within optical waveguide 604. Further, in at least some other embodiments of interferometric device 600, delay element 620 may be omitted.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor cable 114, 116 may include a multiplicity of optical fibers, each of which is coupled to an optical source, and a plurality of sensor devices 118, 120. It is intended that the following claims be interpreted to embrace all such variations and modifications.

What is claimed is:
1. A system comprising:
   an interferometric device including:
      a substrate;
      a first optical waveguide disposed on the substrate;
      a second optical waveguide disposed on the substrate;
      a coupling element disposed on the substrate, the coupling element configured to:
         couple an optical signal in the first optical waveguide to the second optical waveguide; and
         couple an optical signal in the second optical waveguide to the first optical waveguide;

wherein at least one of the optical signal in the first optical waveguide or the optical signal in the second optical waveguide includes phase modulated data having an angle modulation depth; and
a delay element disposed on the substrate, the delay element disposed within one of the first optical waveguide and the second optical waveguide, wherein the delay element provides a delay having a phase angle equal to the angle modulation depth of the modulated data.

2. The system of claim 1 wherein the first and second optical waveguides comprise an optical polymer.

3. The system of claim 1 wherein:
the first optical waveguide comprises a segment configured to couple to a first optical fiber, said segment comprising an input port of the interferometric device; and
the second optical waveguide comprises a segment configured to couple to a second optical fiber, said segment comprising an output port of the interferometric device.

4. The system of claim 1 wherein the substrate is selected from the group consisting of:
printed circuit board material;
plastic;
ceramic;
glass; and
silicon.

5. The system of claim 1 wherein the interferometric device further includes:
a first reflective element disposed at an end of the first optical waveguide configured to reflect optical signals in the first optical waveguide; and
a second reflective element disposed at an end of the second optical waveguide configured to reflect signals in the second optical waveguide.

6. The system of claim 5 wherein each of the first and second reflective elements are selected from the group consisting of:
a mirror;
a Faraday rotating mirror;
a reflective grating;
a phase conjugator; and
a reflective material deposited on the end of a respective one of the first optical waveguide and the second optical waveguide.

7. The system of claim 5 wherein:
the first optical waveguide comprises a segment configured to couple to a first optical fiber, said segment comprising an input port of the interferometric device; and
the second optical waveguide comprises a segment configured to couple to a second optical fiber, said segment comprising an output port of the interferometric device;
wherein the interferometric device further comprises:
a first arm, the first arm comprising a portion of the first optical waveguide disposed between the coupling element and the first reflective element; and
a second arm, the second arm comprising a portion of the second optical waveguide disposed between the coupling element and the second reflective element; and
wherein a length of the first arm and a length of the second arm are unequal.

8. The system of claim 1 wherein the interferometric device is configured for deployment in a water body in an absence of an atmospheric housing.

9. A system comprising:
an interferometric device including:
a substrate;
a first optical waveguide disposed on the substrate;
a second optical waveguide disposed on the substrate;
a coupling element disposed on the substrate, the coupling element configured to:
couple an optical signal in the first optical waveguide to the second optical waveguide; and
couple an optical signal in the second optical waveguide to the first optical waveguide; and
a delay element disposed on the substrate, the delay element disposed within one of the first optical waveguide and the second optical waveguide;
a first reflective element disposed at an end of the first optical waveguide configured to reflect optical signals in the first optical waveguide; and
a second reflective element disposed at an end of the second optical waveguide configured to reflect signals in the second optical waveguide;
wherein the first optical waveguide includes a port disposed opposite the first reflective element and configured to receive optical energy from an optical source;
wherein the second optical waveguide includes a port disposed opposite the second reflective element and configured to couple to a sensor cable deployed proximate to a sea floor beneath a water body.

10. The system of claim 9 wherein each of the first and second reflective elements are selected from the group consisting of:
a mirror;
a Faraday rotating mirror;
a reflective grating;
a phase conjugator; and
a reflective material deposited on the end of a respective one of the first optical waveguide and the second optical waveguide.

11. The system of claim 9 wherein:
the first optical waveguide comprises a segment configured to couple to a first optical fiber, said segment comprising an input port of the interferometric device; and
the second optical waveguide comprises a segment configured to couple to a second optical fiber, said segment comprising an output port of the interferometric device;
wherein the interferometric device further comprises:
a first arm, the first arm comprising a portion of the first optical waveguide disposed between the coupling element and the first reflective element; and
a second arm, the second arm comprising a portion of the second optical waveguide disposed between the coupling element and the second reflective element; and
wherein a length of the first arm and a length of the second arm are unequal.

12. The system of claim 9 wherein the first and second optical waveguides comprise an optical polymer.

13. The system of claim 9 wherein:
the first optical waveguide comprises a segment configured to couple to a first optical fiber, said segment comprising an input port of the interferometric device; and
the second optical waveguide comprises a segment configured to couple to a second optical fiber, said segment comprising an output port of the interferometric device.

14. A system comprising:
an interferometric device including:
- a substrate;
- a first optical waveguide disposed on the substrate;
- a second optical waveguide disposed on the substrate;
- a coupling element disposed on the substrate, the coupling element configured to:
  - couple an optical signal in the first optical waveguide to the second optical waveguide; and
  - couple an optical signal in the second optical waveguide to the first optical waveguide; and
- a delay element disposed on the substrate, the delay element disposed within one of the first optical waveguide and the second optical waveguide;

a sensor cable for deployment beneath a water body; and
an optical source generating an optical energy in the sensor cable;
wherein the first optical waveguide of the interferometric device is configured to couple a portion of the optical energy in the sensor cable into a segment of the first optical waveguide; and
wherein the interferometric device is configured to generate an optical interferometric signal within the second optical waveguide.

15. The system of claim 14 further including a detector configured to detect the optical interferometric signal and to demodulate data therein.

16. The system of claim 14 wherein the detector is located at a surface of the water body.

17. The system of claim 14 wherein the interferometric device further includes:
- a first reflective element disposed at an end of the first optical waveguide configured to reflect optical signals in the first optical waveguide; and
- a second reflective element disposed at an end of the second optical waveguide configured to reflect signals in the second optical waveguide.

18. The system of claim 17 wherein each of the first and second reflective elements are selected from the group consisting of:
- a mirror;
- a Faraday rotating mirror;
- a reflective grating;
- a phase conjugator; and
- a reflective material deposited on the end of a respective one of the first optical waveguide and the second optical waveguide.

19. The system of claim 17 wherein:
the first optical waveguide comprises a segment configured to couple to a first optical fiber, said segment comprising an input port of the interferometric device; and
the second optical waveguide comprises a segment configured to couple to a second optical fiber, said segment comprising an output port of the interferometric device;
wherein the interferometric device further comprises:
- a first arm, the first arm comprising a portion of the first optical waveguide disposed between the coupling element and the first reflective element; and
- a second arm, the second arm comprising a portion of the second optical waveguide disposed between the coupling element and the second reflective element; and
wherein a length of the first arm and a length of the second arm are unequal.

20. The system of claim 14, wherein the interferometric device is configured for deployment in a water body in an absence of an atmospheric housing.

* * * * *